United States Patent [19]
Guzzini et al.

[11] Patent Number: 5,511,968
[45] Date of Patent: Apr. 30, 1996

[54] INJECTION NOZZLE FOR A MOULD

[75] Inventors: Vinicio Guzzini; Igino Guzzini; Cherubino Guzzini; Alberto Guzzini, all of Recanati, Italy

[73] Assignee: Acrilux S.p.A., Italy

[21] Appl. No.: 263,268

[22] Filed: Jun. 21, 1994

Related U.S. Application Data

[63] Continuation of Ser. No. 899,545, Jun. 16, 1992, abandoned.

[30] Foreign Application Priority Data

Jun. 28, 1991 [IT] Italy .................. MI91A1779

[51] Int. Cl.⁶ ...................................... B29C 45/23
[52] U.S. Cl. .................. 425/564; 264/328.9; 425/566
[58] Field of Search ..................... 425/549, 562, 425/563, 564, 565, 566; 264/572, 328.9

[56] References Cited

U.S. PATENT DOCUMENTS

| | | | |
|---|---|---|---|
| 4,595,552 | 6/1986 | Hahn. | |
| 4,685,881 | 8/1987 | Sasaki | 264/572 |
| 4,810,184 | 3/1989 | Gellert et al. | 425/564 |
| 4,923,387 | 5/1990 | Gellert | 425/549 |
| 5,052,100 | 10/1991 | Trakas | 425/549 |

FOREIGN PATENT DOCUMENTS

| | | |
|---|---|---|
| 576327 | 3/1985 | Australia. |
| 0282999 | 9/1988 | European Pat. Off.. |
| 2316281 | 10/1974 | Germany. |
| 2615282 | 11/1976 | Germany. |
| 4021782 | 1/1992 | Germany. |
| 2124968 | 2/1984 | United Kingdom. |

*Primary Examiner*—Tim Heitbrink
*Attorney, Agent, or Firm*—Kirschstein et al.

[57] ABSTRACT

Injection nozzle for a mould, with a straight sprue. The shutoff valve is accommodated in a suitable seat which obliquely intersects the sprue and opens out in the gate. During injection the head of the shutoff valve leaves the sprue clear. After injection the head of the shutoff valve shuts off the gate.

7 Claims, 2 Drawing Sheets

INJECTION NOZZLE FOR A MOULD

This is a continuation of application Ser. No. 07/899,545, filed Jun. 16,1992, now abandoned.

BACKGROUND OF THE INVENTION

1. Field of the Invention

The invention relates to an injection nozzle for a mould, for example for synthetic materials, for the production of, for example, hollow objects such as candle glasses and cups. Afterwards the hollow bodies can be blown to form, for example, spheres for lighting bodies.

2. Description of Related Art

Known injection nozzles comprise bodies in several parts with a sprue which accommodates a pin- or slide-type shutoff valve that can be moved back and forth to shut off and leave clear the gate into the mould.

These known nozzles entail certain disadvantages. The presence of moving parts in the sprue and the consequent need to activate them makes it necessary to deflect this sprue at the points where the moving parts act. As a consequence of this the injected fluid strikes said moving parts, downstream of the point of action, from a direction that does not coincide with the axis of the moving parts. This causes variations in speed in the flow of fluid injected into the mould, for which the speed diagram is consequently asymmetric and, in most cases, is not centered upon the axis of the sprue. It also causes an irregular and asymmetric feed of material into the mould and consequent defects in the moulded part, such as nonuniform thickness or temperature, tensions and formation of weld runs between uneven flows of material in the mould cavity. The presence of moving parts in the sprue encourages the stagnation of particles of material inside the sprue. When changing the colour of the material to be injected, residues from the previous job remaining in the sprue are incorporated by the new material with the other colour and create spots and stains of a different colour in the moulded parts. Known nozzles made of several parts are structurally complex and make it difficult to achieve an even temperature along the sprue.

SUMMARY OF THE INVENTION

The object of the invention is to create an injection nozzle for moulds which is structurally simple, compact and of a low number of parts, which delivers a uniform flow of material and which avoids the formation of residues in the sprue, as a result of which the moulded parts obtained are unexceptionable, being without nonuniformities of thickness and surface irregularities.

In a nozzle of the type in question, comprising a sprue and a shutoff valve with which to close the gate, the object is achieved according to the invention in that there are no intrusions into the path of the sprue from the feedpoint to the gate into the hole of the mould, in that a shutoff valve is accommodated in its own seat, which intersects the sprue at its lower end, and in that the shutoff valve is movable from a position in which the shutoff valve shuts off the sprue gate to a position in which the shutoff valve leaves the sprue clear.

This produces a simple, compact structure that can be made at low cost on automatic machines owing to the fact that the nozzle body is in one piece.

A uniform distribution of the temperature along the length of the sprue is achieved, as also is a simple execution of the sprue owing to the fact that the sprue is straight.

The nozzle body takes up little space owing to the fact that the longitudinal axis of the hole that accommodates the shutoff valve contains with the longitudinal axis of the sprue an acute angle of approximately 20°.

No material can be deposited in the sprue and moulded parts without sprue material are obtained that are suitable for the blowing of unexceptionable hollow bodies, owing to the fact that the injection hole of the mould and the shutoff valve head are frustoconical, and that after the injection the shutoff valve head shuts off the mould hole.

The structure is simplified, the number of components is reduced and precise shutoff valve movement is achieved owing to the fact that the shutoff valve is connected to a piston moving in a cylinder, and that the cylinder is a recess inside the nozzle body.

By means of a slight amount of work, rotation of the shutoff valve is prevented owing to the fact that the tip of a screw accommodated in the nozzle body enters an axial groove in the shutoff valve.

A temperature-regulating apparatus of simple construction and providing a uniform temperature along the sprue may be made owing to the fact that there are accommodated in the nozzle body, around the sprue, rod-shaped temperature-regulating bodies, and that the lines of connection of the temperature-regulating bodies are installed in radial channels.

The temperature-regulating bodies may be formed by electrical resistors. Regulating bodies conveying a heating/cooling fluid may also be used. The nozzle according to the invention also allows, with advantage, the construction of a heating apparatus and of a temperature-regulating apparatus employing a fluid. The rod-shaped heating or temperature-regulating bodies can be incorporated without increasing the size of the nozzle.

The advantage procured by the invention consists in the fact that the material is fed into the mould with a uniform speed across the full cross-section of the injection hole of the mould and in the fact that vortexes and deviations in the flow in the mould cavity are prevented. The material fills the mould cavity, flowing perfectly radially from the centre with respect to the admission hole. Both variations in the thickness of the walls of the part and the familiar weld lines are thus eliminated. The moulded parts are also free of residual materials from previous mould operations and may without more ado be blown, for the production of hollow articles, such as spheres, for lighting bodies.

BRIEF DESCRIPTION OF THE DRAWINGS

An illustrative embodiment of the nozzle according to the invention is shown in the drawings and described in greater detail below. In the drawings.

DETAILED DESCRIPTION OF THE PREFERRED EMBODIMENT

Figure 1:
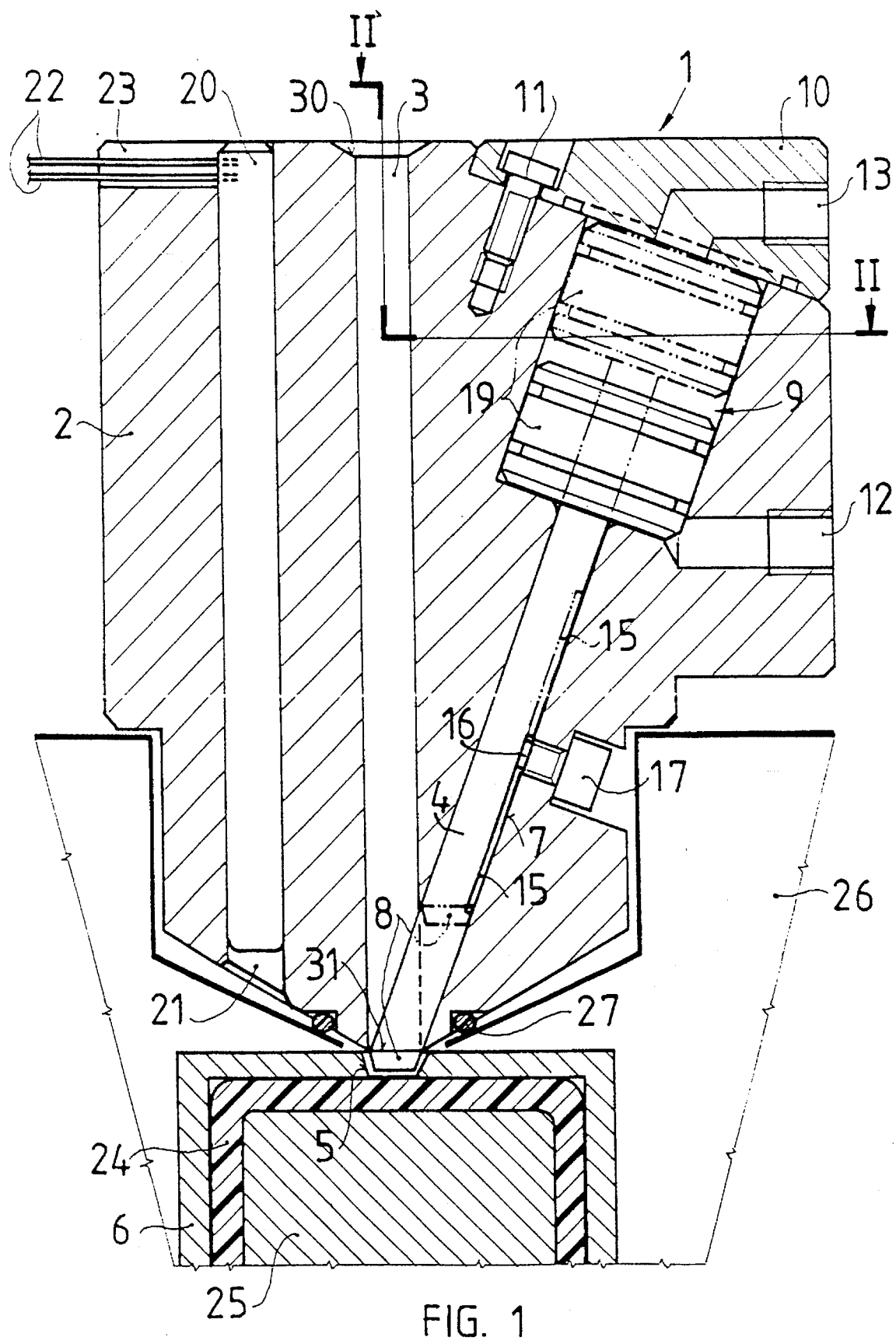
FIG. 1 shows a longitudinal section taken through the line I—I of FIG. 2.
Figure 2:
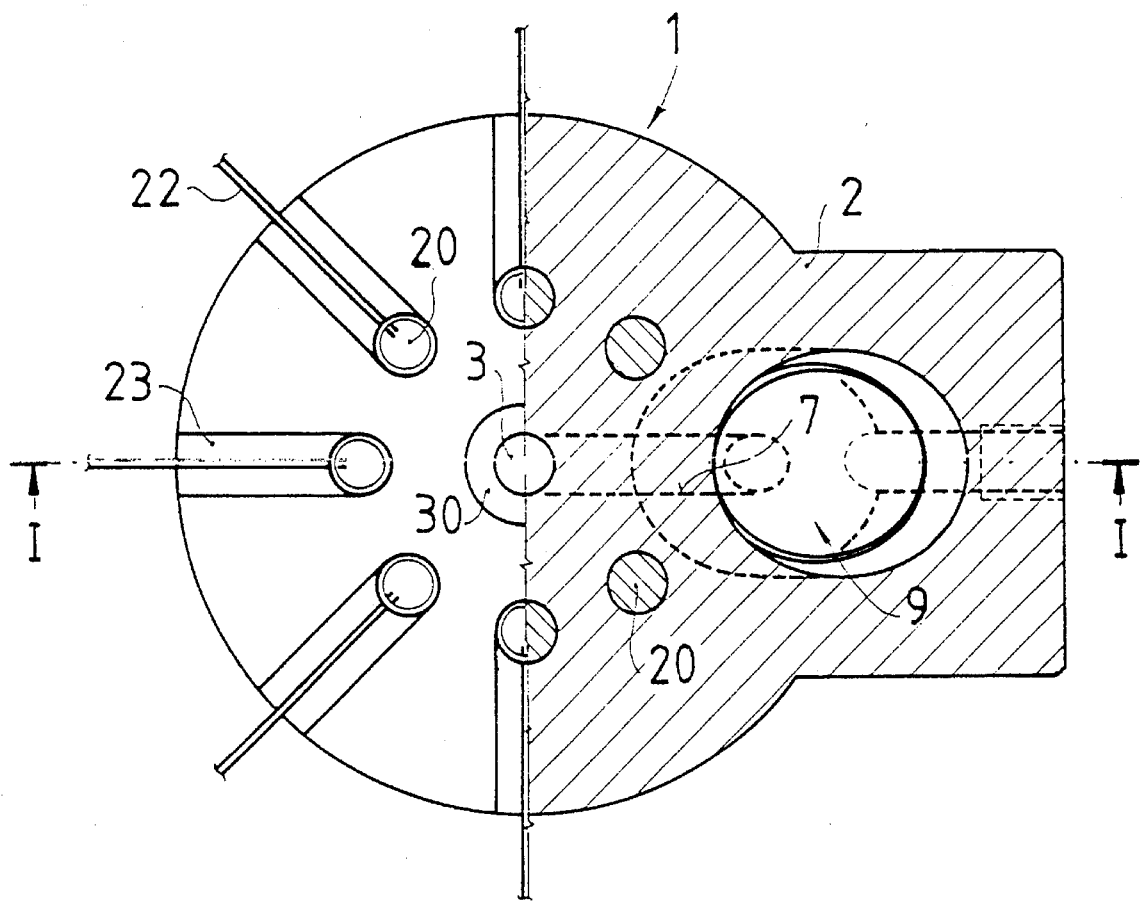
FIG. 2 shows a plan view taken half externally and half in section through the line II—II of FIG. 1.

The injection nozzle 1 has a body 2 with a sprue 3 and a pin-type shutoff valve 4. The reference numeral 5 indicates a hole in the mould 6.

According to the invention, the body 2 is in one piece and there are no intrusions into the sprue 3. The sprue 3 extends from the feedpoint 30 to the sprue gate 31 and is given a smooth, for example dead-bright, surface. The path of the sprue 3 is straight. In the example illustrated the sprue 3 is formed down the central axis of the nozzle body 2. The pin-type shutoff valve 4 can be moved back and forth in its own seat, which in the example is a hole 7. The longitudinal axis of the hole 7 forms with the longitudinal axis of the sprue 3 an acute angle, for example of about 20°. The hole 7 runs obliquely towards the sprue gate 31 and opens out over the mold hole 5, intersecting the lower end of the sprue 3 from one side. In the example shown, the shutoff valve head 8 and the hole 5 of the mould 6 are frustoconical in form. The pin-type shutoff valve 4 is connected to a double-acting piston 19 in a cylinder 9 which may be hydraulic or pneumatic. The cylinder 9 is a recess in the body 2 of the nozzle and is closed at the top by a cap 10 with screws 11. The connections for the operating fluid are indicated by the reference numerals 12 and 13.

The shutoff valve 4 has a longitudinal groove 15 in which the tip 16 of a screw 17 enters to prevent the shutoff valve from rotating. The screw 17 is accommodated in the body 2 of the valve and the length of the groove 15 is greater than the reversible stroke of the valve 4.

With the piston 19 in the retracted position, indicated by the broken line, the shutoff valve head 8 is fully out of the sprue 3. In the fully advanced position indicated by the solid line, the head 8 shuts off the mould hole 5 and closes the sprue 3.

An apparatus with electrical resistors 20 inserted in holes 21 parallel to the sprue 3 is provided for heating purposes. The resistors 20 are distributed around a circumference that is concentric with the sprue 3. The electrical supply lines 22 are accommodated in radial channels 23. Also provided in the body 2 is an apparatus, not shown, for a temperature-regulating fluid. This apparatus may be constructed like the electrical heating apparatus. The electrical resistors are replaced by rod-shaped bodies with valves for the circulation of a fluid. The rod-shaped bodies are interconnected by conductors connected to a source of temperature regulation.

FIG. 1 illustrates a hollow moulded part 24 in the cavity between the mould 6 and the mating mould 25. The mould is accommodated interchangeably in the support 26. The reference numeral 27 indicates an O-ring.

The nozzle operates as follows: during the injection phase the shutoff valve head 8 is situated in the hole 7 in the position indicated by the broken lines, that is fully out of the sprue 3. The material flows through the sprue 3, without encountering any obstacles, and then into the mould cavity with a uniform speed across the full cross-section of the hole 5. The material can thus spread uniformly and perfectly concentrically through the mould cavity, first over the base and then into the mantle part. After the injection phase the piston 19 causes the shutoff valve 4 to advance and pushes it towards the sprue gate 31. As the head 8 advances, it drives back into the sprue 3 the fluid material lying in the hole 7 beside the sprue 3 and then the material lying in the lower part of the sprue 3 and in the hole 5. At its end of stroke, the head 8 closes off and shuts the hole 5. In its back-and-forth movements the head 8 acts as a scraper upon the corner of intersection between the sprue 3 and the hole 7. This prevents any residue of material in the bottom end of the sprue 3 and in the hole 5.

The uniformity of feed of the flow is guaranteed by the fact that the straight sprue, with its smooth walls and absence of intrusions, rules out any separation or turning of the flow along the sprue itself, or in the mould hole or in the mould cavity.

The proposed nozzle may be used in the injection moulding of synthetic and metal materials. The shutoff valve control cylinder 9 can be replaced directly by cams, inclined profiles, flexible cables working under tensile or compressive forces or other such means of actuation. Whatever the case, the support for the shutoff valve actuating means may be constructed without difficulty inasmuch as the point of application of the force on the valve is located externally to the sprue.

We claim:

1. An injection molding arrangement, comprising:
   a) a mold having a frusto-conical mold hole symmetrical about a longitudinal axis;
   b) an injection nozzle including a body, a sprue extending along the longitudinal axis through the body for conveying a moldable, flowable material from a feedpoint on the body to a sprue gate, said sprue gate being positioned upstream of the mold and the mold hole, and an elongated passage extending through the body along an inclined axis that forms an acute angle of inclination with the longitudinal axis; and
   c) valve means including a rod mounted in the passage for movement along the inclined axis, a valve head at a leading end of the rod and having a frusto-conical shape of complementary contour to the mold hole and being symmetrical about a head axis, and drive means for moving the head between an open position remote from the mold hole to permit the material to flow from the sprue gate into the mold hole, and a closed position in which the head projects downstream along the longitudinal axis away from the sprue gate and is seated in, and fully closes, the mold hole to resist material flow into the mold hole, said head axis being generally parallel to the longitudinal axis in the open position and being co-linear with the longitudinal axis in the closed position.

2. The arrangement according to claim 1, wherein the angle of inclination is about 20°.

3. The arrangement according to claim 1, wherein the longitudinal and inclined axes intersect at the sprue gate.

4. The arrangement according to claim 1, wherein the body has a recess in which the drive means is received; and further comprising a cap overlying the recess.

5. The arrangement according to claim 1, wherein the rod has a groove extending linearly along the rod; and further comprising an element mounted on the body and having a tip extending into the groove.

6. The arrangement according to claim 1, and further comprising temperature regulators mounted in the body about the longitudinal axis.

7. The arrangement according to claim 1, wherein the mold has upper and lower, generally planar, surfaces through which the mold hole extends; and wherein the valve head has a generally planar bottom surface that is generally co-planar with the lower surface of the mold in the closed position.

* * * * *